United States Patent
Yu et al.

(10) Patent No.: US 11,572,445 B2
(45) Date of Patent: Feb. 7, 2023

(54) MODIFIED ASPHALT AND PREPARATION METHOD THEREFOR

(71) Applicant: Central Fortune Creation Technology Group Co., Ltd., Guangdong (CN)

(72) Inventors: Jiangmiao Yu, Foshan (CN); Guocheng Su, Foshan (CN); Guangliang Mo, Foshan (CN); Fuda Chen, Foshan (CN); Lijuan Chen, Foshan (CN); Jianyuan Lu, Foshan (CN)

(73) Assignee: Central Fortune Creation Technology Group Co., Ltd., Guangdong (CN)

( * ) Notice: Subject to any disclaimer, the term of this patent is extended or adjusted under 35 U.S.C. 154(b) by 384 days.

(21) Appl. No.: 16/650,099

(22) PCT Filed: Dec. 27, 2018

(86) PCT No.: PCT/CN2018/124387
§ 371 (c)(1),
(2) Date: Mar. 24, 2020

(87) PCT Pub. No.: WO2019/129148
PCT Pub. Date: Jul. 4, 2019

(65) Prior Publication Data
US 2020/0223987 A1    Jul. 16, 2020

(30) Foreign Application Priority Data
Dec. 28, 2017 (CN) .......................... 201711461130.5

(51) Int. Cl.
*C08J 3/00* (2006.01)
*C08L 95/00* (2006.01)

(52) U.S. Cl.
CPC .............. *C08J 3/005* (2013.01); *C08L 95/00* (2013.01); *C08J 2395/00* (2013.01); *C08J 2453/02* (2013.01); *C08L 2205/035* (2013.01); *C08L 2555/84* (2013.01)

(58) Field of Classification Search
CPC .................................. C08J 3/00; C08L 95/00
USPC ......................................................... 523/346
See application file for complete search history.

(56) References Cited

FOREIGN PATENT DOCUMENTS

| | | | |
|---|---|---|---|
| CN | 101466495 A | | 6/2009 |
| CN | 101560332 A | | 10/2009 |
| CN | 101560332 B | * | 7/2011 |
| CN | 103468010 A | | 12/2013 |
| CN | 103740119 A | | 4/2014 |
| CN | 104070217 A | | 10/2014 |
| CN | 104476684 A | | 4/2015 |
| CN | 106221252 A | | 12/2016 |
| CN | 107163597 A | | 9/2017 |
| CN | 108034270 A | | 5/2018 |
| CN | 108381258 A | | 8/2018 |
| JP | H06204324 A | | 7/1994 |

OTHER PUBLICATIONS

International Search Report, dated Mar. 11, 209, PCT/CN2018/124387.

* cited by examiner

*Primary Examiner* — Deve V Hall
(74) *Attorney, Agent, or Firm* — Troutman Pepper Hamilton Sanders LLP

(57) ABSTRACT

The modified asphalt provided by the disclosure is prepared from the following raw materials in parts by weight: 100 to 120 parts of asphalt, 6 to 20 parts of a modifier, 3 to 9 parts of a compatibilizer, 0.15 to 0.25 parts of sulfur, 0.4 to 0.6 parts of a non-amine anti-stripping agent and 0.2 to 0.4 parts of a coupling agent; and the modifier comprises a styrene-butadiene-styrene block copolymer, a rubber, and a polyurethane. The modified asphalt provided by the disclosure can simultaneously satisfy an elastic recovery at 25° C. of ≥98%, a dynamic viscosity at 60° C. of ≥500,000 Pa·s, a composite shear modulus at 60° C. of ≥10 Pa, and a critical temperature at G*/Sin≥2.2 kPa of ≥94° C.

18 Claims, No Drawings

MODIFIED ASPHALT AND PREPARATION METHOD THEREFOR

TECHNICAL FIELD

The invention belongs to the technical field of road building materials and particularly relates to a modified asphalt and preparation method therefor.

BACKGROUND

Asphalt is an indispensable bonding material for road construction and pavement maintenance projects. With the rapid development of highway construction and maintenance work, the demand for asphalt is increasing year by year. At present, countries all over the world have been dedicated to advocating the "resource-efficient and environment-friendly" development concept, and various types of thin-layer asphalt pavement structure systems are the main development direction of highway construction and maintenance in response to this concept. In addition, China has proposed the construction of "sponge cities," and high-performance water-permeable asphalt pavement is a key link in the process of building "sponge cities." In the road industry, the development of related concepts requires higher performance and a more durable asphalt binder system.

As a typical viscoelastic material, the viscosity and elasticity indexes of the asphalt binder are both of great significance in project implementation. At present, there are many high-viscosity modified asphalts on the market, as well as high-elasticity modified asphalt systems. However, due to the contradiction between these two indexes, it is very difficult to obtain high viscosity and high elasticity indexes in the same asphalt binder at the same time. Meanwhile, asphalt binders with dual characteristics of high viscosity and high elasticity are considered to be a major development direction of current high performance asphalts, and are extremely important bonding materials for ultra-thin asphalt structure systems and water-permeable asphalt pavement systems.

SUMMARY

The object of the disclosure is to provide a modified asphalt, and the modified asphalt provided by the disclosure has relatively high viscoelasticity.

In order to achieve the above object, this disclosure provides a modified asphalt, which is prepared from the following raw materials in parts by weight: 100 to 120 parts of a matrix asphalt, 6 to 20 parts of a modifier, 3 to 9 parts of a compatibilizer, 0.15 to 0.25 parts of sulfur, 0.4 to 0.6 parts of a non-amine anti-stripping agent and 0.2 to 0.4 parts of a coupling agent; and the modifier comprises a styrene-butadiene-styrene block copolymer, a rubber, and a polyurethane.

Preferably, the mass ratio of the styrene-butadiene-styrene block copolymer, rubber, and polyurethane in the modifier is 1 to 4:0.5 to 2:0.5 to 2.

Preferably, the styrene-butadiene-styrene block copolymer has a star-shaped structure, and a number average molecular weight of greater than 200,000;

The rubber is a rubber powder, and has a particle diameter of 40 to 100 meshes;

The polyurethane has a number average molecular weight of greater than 10,000.

Preferably, the compatibilizer is one or more of aromatic hydrocarbons, linear alkanes, and cycloalkanes.

Preferably, the coupling agent is a silane coupling agent.

The disclosure also provides a method for preparing the modified asphalt according to the above technical solution, comprising the following steps:

(1) mixing melted matrix asphalt with a modifier, a compatibilizer, and a coupling agent to obtain a premix;

(2) subjecting the premix obtained in step (1) sequentially to shearing and swelling to obtain the first mix;

(3) mixing the first mix obtained in step (2) with a non-amine anti-stripping agent and sulfur to obtain a second mix;

(4) subjecting the second mix obtained in step (3) sequentially to shearing, milling and development to obtain a modified asphalt.

Preferably, the temperature of the mixing in step (1) is 160-180° C.

Preferably, the velocity of shearing in step (2) and step (4) is independently 7,000 to 10,000 r/min, and the time of shearing is independently 30 to 50 minutes.

Preferably, the time of swelling in step (2) is 30 to 50 minutes.

Preferably, the velocity of milling in step (4) is 10,000 to 14,000 r/min, and the time of milling is 10 to 30 minutes.

The modified asphalt provided by the disclosure is prepared from the following raw materials in parts by weight: 100 to 120 parts of asphalt, 6 to 20 parts of a modifier, 3 to 9 parts of a compatibilizer, 0.15 to 0.25 parts of sulfur, 0.4 to 0.6 parts of a non-amine anti-stripping agent and 0.2 to 0.4 parts of a coupling agent; and the modifier comprises a styrene-butadiene-styrene block copolymer, a rubber and a polyurethane. In this disclosure, the modifier comprises a styrene-butadiene-styrene block copolymer, a rubber, and a polyurethane as main components, which can form a three-dimensionally cross-linked structure after dissolved with the matrix asphalt, thereby improving the mechanical properties of the matrix asphalt; and the addition of a compatibilizer, sulfur, a coupling agent and other components further promotes the uniform dispersion of the modifier in the matrix asphalt, and provides conditions for the modifier to exert its action. The above components work together to obtain a modified asphalt with higher viscosity and elasticity. The results of examples show that the modified asphalt provided by the disclosure can simultaneously satisfy: an elastic recovery at 25° C. of ≥98%, a dynamic viscosity at 60° C. of ≥500,000 Pa·s, a composite shear modulus at 60° C. of ≥10 Pa, and a critical temperature at $G^*/\mathrm{Sin}\ \delta \geq 2.2$ kPa above 94° C.

DESCRIPTION OF THE EMBODIMENTS

This disclosure provides a modified asphalt, which is prepared from the following raw materials in parts by weight: 100 to 120 parts of asphalt, 6 to 20 parts of a modifier, 3 to 9 parts of a compatibilizer, 0.15 to 0.25 parts of sulfur, 0.4 to 0.6 parts of a non-amine anti-stripping agent and 0.2 to 0.4 parts of a coupling agent; and the modifier comprises a styrene-butadiene-styrene block copolymer, a rubber, and a polyurethane.

In this disclosure, unless otherwise specified, the raw materials of the modified asphalt are commercially available products well known to those skilled in the art.

The raw materials of the modified asphalt provided by this disclosure include in parts by weight: 100 to 120 parts of matrix asphalt, further preferably 105 to 115 parts, more preferably 108 to 112 parts. The specific model of the matrix asphalt is not particularly limited in this disclosure, and those well known to a person skilled in the art can be used. In this disclosure, the matrix asphalt is preferably 50# asphalt, 70# asphalt, or 90# asphalt.

Based on the matrix asphalt in the stated parts by weight, the modified asphalt provided by this disclosure comprises 6 to 20 parts of a modifier, further preferably 8 to 18 parts, more preferably 12 to 18 parts. This disclosure uses a styrene-butadiene-styrene block copolymer, rubber, and polyurethane to form a modifier, which can form a three-dimensionally cross-linked structure after dissolved with the matrix asphalt. The base material is wrapped in the cross-linked structure to make the overall viscosity and elasticity of the modified asphalt improved. In this disclosure, the mass ratio of the styrene-butadiene-styrene block copolymer (hereinafter referred to as SBS), rubber and polyurethane in the modifier is 1 to 4:0.5 to 2:0.5 to 2, further preferably 1.5 to 3.5:1 to 1.8:0.8 to 1.5, more preferably 1.8 to 3:1.2 to 1.5:1.0 to 1.2.

In this disclosure, the SBS is preferably a star-shaped structure. In this disclosure, the number average molecular weight of the SBS is preferably greater than 200,000, further preferably 210,000 to 500,000, more preferably 250,000 to 450,000. In this disclosure, the rubber is preferably a rubber powder, and the particle diameter of the rubber powder is preferably 40 to 100 meshes, further preferably 60 to 100 meshes, more preferably 80 to 100 meshes. In this disclosure, the specific surface area of the rubber powder is preferably above 2 m$^2$/g, further preferably 3 to 14 m$^2$/g, more preferably 5 to 10 m$^2$/g. In this disclosure, the number average molecular weight of the polyurethane is preferably greater than 10,000, further preferably 10,000 to 500,000, more preferably 100,000 to 300,000. The specific sources of the SBS, rubber powder, and polyurethane are not particularly limited in this disclosure, as long as the above-mentioned parameters can be controlled. In this disclosure, the modifier has excellent viscosity and elasticity preferably by defining various parameters, the SBS structure and number average molecular weight, the particle size and specific surface area of the rubber powder, and the number average molecular weight of the polyurethane.

Based on the matrix asphalt in the stated parts by weight, the modified asphalt provided by this disclosure comprises 3 to 9 parts of the compatibilizer, preferably 3.5 to 8 parts, further preferably 4 to 6 parts. In this disclosure, the compatibilizer is preferably one or more of aromatic hydrocarbons, linear alkanes, and cycloalkanes, and is further preferably a linear alkane. In this disclosure, the number of carbon atoms of the aromatic hydrocarbons, linear alkanes and cycloalkanes is independently preferably C7 to C14, further preferably C8 to C12. In this disclosure, when the compatibilizer is a mixture of several components, the content ratio of the various components in the mixture is not particularly limited in this disclosure. This disclosure further defines the components and amount of the compatibilizer in the above manner to promote the indissolubility between the modifier and the matrix asphalt, and facilitate a better formation of the three-dimensionally cross-linked structure.

Based on the matrix asphalt in the stated parts by weight, the modified asphalt provided by this disclosure comprises 0.15 to 0.25 parts of sulfur, preferably 0.18 to 0.22 parts, more preferably 0.2 parts. In this disclosure, the particle size of sulfur is not particularly limited, and those well known to a person skilled in the art can be used. This disclosure improves the storage stability of the modified asphalt by adding sulfur.

Based on the matrix asphalt in the stated parts by weight, the modified asphalt provided by this disclosure comprises 0.4 to 0.6 parts of a non-amine anti-stripping agent, further preferably 0.45 to 0.55 parts. In this disclosure, the non-amine anti-stripping agent is preferably an XT-1 type asphalt anti-stripping agent and an XT-2 type asphalt anti-stripping agent, further preferably an XT-1 type asphalt anti-stripping agent. In this disclosure, the non-amine anti-stripping agent can improve the adhesion between the matrix asphalt and the aggregate through physical adsorption and chemical action, thereby improving the water damage resistance of the modified asphalt.

Based on the matrix asphalt in the stated parts by weight, the modified asphalt provided by this disclosure comprises 0.2 to 0.4 parts of a coupling agent, further preferably 0.25 to 0.35 parts. In this disclosure, the coupling agent is preferably a silane coupling agent, further preferably KH550 or KH560. This disclosure uses the coupling agent to improve the performance of the asphalt for bonding with aggregates and cement concrete aggregates so that the modified asphalt has a higher bonding performance.

The modified asphalt provided by this disclosure can simultaneously satisfy an elastic recovery at 25° C. of ≥98%, a dynamic viscosity at 60° C. of ≥500,000 Pa·s, a composite shear modulus at 60° C. of ≥10 Pa, and a critical temperature at G*/Sin δ≥2.2 kPa above 94° C.

The disclosure also provides a method for preparing the modified asphalt according to the above technical solution, comprising the following steps:

(1) mixing melted asphalt with a modifier, a compatibilizer, and a coupling agent to obtain a premix;

(2) subjecting the premix obtained in step (1) sequentially to shearing and swelling to obtain the first mix;

(3) mixing the first mix obtained in step (2) with a non-amine anti-stripping agent and sulfur to obtain a second mix;

(4) subjecting the second mix obtained in step (3) sequentially to shearing, milling and development to obtain a modified asphalt.

In this disclosure, melted matrix asphalt is mixed with a modifier, a compatibilizer, and a coupling agent to obtain a premix. In this disclosure, the modifier is obtained, preferably by mixing a styrene-butadiene-styrene block copolymer, rubber, and polyurethane at normal temperature. The order of mixing the styrene-butadiene-styrene block copolymer, rubber, and polyurethane is not particularly limited in this disclosure. The mixing according to this disclosure, is completed preferably under stirring conditions to uniformly mix the styrene-butadiene-styrene block copolymer, rubber, and polyurethane. The specific implementation of stirring is not particularly limited in this disclosure, as long as it achieves a uniform mixture of the various components. In this disclosure, the manner of mixing is defined so as to obtain the modification effect of better viscoelasticity.

The manner of melting the matrix asphalt is not particularly limited in this disclosure. In this disclosure, the melting temperature of the matrix asphalt is preferably 160 to 200° C., further preferably 165 to 175° C. The melting time is preferably 2 to 3 hours, further preferably 2.2 to 2.8 hours. In this disclosure, the temperature at which the melted matrix asphalt is mixed with the modifier, compatibilizer, and coupling agent is preferably 160 to 200° C., further preferably 165 to 175° C. In this disclosure, the mixing is performed preferably under stirring conditions. The specific implementation of stirring is not particularly limited in this disclosure, as long as it achieves a uniform dispersion of the various components. The order of mixing the melted matrix asphalt, modifier, compatibilizer, and coupling agent is not particularly limited in this disclosure.

After the premix is obtained, the premix is sheared and swelled sequentially to obtain the first mix in this disclosure. According to this disclosure, when the premix is sheared, the residual heat of the premix is used to keep the mixing system in a slurry state, and only the premix needs heat insulation. The specific implementation of heat insulation is not particularly limited in this disclosure, and those well known to a person skilled in the art can be used. In this disclosure, the shearing velocity is preferably 7,000 to 10,000 r/min, further preferably 8,000 to 9,000 r/min; the shearing time is preferably 30 to 50 minutes, further preferably 35 to 48 minutes, more preferably 40 to 45 minutes. The specific implementation of shearing is not particularly limited in this disclosure, and those well known to a person skilled in the art can be used.

After the premix is sheared, the sheared premix is swelled. In this disclosure, the swelling temperature is preferably 165 to 175° C., further preferably 170° C.; the swelling time is preferably 30 to 50 minutes, further preferably 35 to 48 minutes, more preferably 40 to 45 minutes. The specific implementation of swelling is not particularly limited in this disclosure, as long as the above-mentioned parameters can be controlled. The swelling is performed in a swelling tank according to this disclosure.

In this disclosure, the premix is sheared and swelled sequentially, and the modifier is sufficiently dispersed in the matrix asphalt by the strong shear force and collision effect, and meanwhile, the particles of each component can be refined to form a stable miscible system; and swelling provides favorable conditions for the modifier to form a three-dimensionally cross-linked structure with the matrix asphalt.

After the first mix is obtained, the first mix is mixed with a non-amine anti-stripping agent and sulfur to obtain a second mix according to this disclosure. In this disclosure, the temperature at which the first mix is mixed with the non-amine anti-stripping agent and sulfur is preferably 170 to 180° C., further preferably 172 to 178° C. In this disclosure, the mixing is performed preferably under stirring conditions. The specific implementation of stirring is not particularly limited in this disclosure, as long as it achieves the purpose of evenly mixing the various components.

After the second mix is obtained, the second mix is sequentially sheared and milled to obtain the modified asphalt in this disclosure. According to this disclosure, when the second mix is sheared, it is not necessary to additionally heat the second mix, and the waste heat of the second mix is used to keep the mixing system in a slurry state. In this disclosure, the shearing velocity of the second mix is preferably 7,000 to 10,000 r/min, further preferably 8,000 to 9,000 r/min; the shearing time of the second mix is preferably 30 to 50 minutes, further preferably 35 to 48 minutes, more preferably 40 to 45 minutes. The specific implementation of shearing is not particularly limited in this disclosure, and those well known to a person skilled in the art can be used. In this disclosure, the second mix is sheared, and the non-amine anti-stripping agent and sulfur are sufficiently mixed with the first mix by the strong force generated during shearing, further increasing the stability of the mixing system of the second mix, and improving the water damage resistance of the matrix asphalt.

After the second mix is sheared, the sheared second mix is milled to obtain an initial sample of the modified asphalt in this disclosure. Milling the sheared second mix not only further refines the average particle diameter of the modifier in the initial sample, but also makes the three-dimensionally cross-linked structure of the modifier more sufficient, makes the modifier more stable in matrix asphalt, and reduces the risk of premature segregation. The milling speed in this disclosure is preferably 10,000 to 14000 r/min, further preferably 12000 r/min, and the milling time is preferably 10 to 30 minutes, further preferably 15 to 28 minutes. The milling according to this disclosure is carried out preferably in a colloid mill. In this disclosure, the average particle diameter of the modifier in the initial sample of the modified asphalt is preferably <4 µm, further preferably 0.1 to 3 µm.

After the initial sample of the modified asphalt is obtained, the initial sample of the modified asphalt is developed in this disclosure, so that the modifier is involved in a crosslinking reaction in the matrix asphalt, thereby facilitating the formation a three-dimensional network structure and ensuring the viscoelastic effect of the obtained modified asphalt. In this disclosure, the modified asphalt is preferably transferred to a finished product development tank for development. In this disclosure, the development temperature is preferably 170 to 190° C., further preferably 180° C., and the development time is preferably 24 to 48 hours, further preferably 36 to 48 hours. In this disclosure, the initial sample of the modified asphalt is developed, and the modifier is sufficiently dissolved with the matrix asphalt by the action of elevated temperatures to form a stable three-dimensionally cross-linked structure, thereby ensuring the storage stability and viscoelastic properties of the modified asphalt.

In order to further illustrate this disclosure, the modified asphalt and the preparation method thereof provided by this disclosure are described herein below in detail with reference to the examples, but they cannot be considered to be limiting the scope of protection of this disclosure.

EXAMPLE 1

In parts by weight:

Modifier: obtained by mixing two parts of SBS with a number average molecular weight of 300,000, 1 part of rubber powder with a particle size of 80 meshes, and 1 part of polyurethane with a number average molecular weight of 100,000 at room temperature for 20 minutes.

Raw materials: 110 parts of 50# matrix asphalt, 13 parts of a modifier, four parts of sodium dodecyl benzenesulfonate, 0.2 parts of sulfur, 0.5 parts of XT-1 type anti-stripping agent and 0.3 parts of KH560;

The matrix asphalt is heated at 175° C. for 2 hours, followed by the addition of the modifier, sodium dodecyl benzenesulfonate, and KH560, which is stirred for 20 minutes to obtain a premix;

The premix is fed into a shear pump and sheared for 50 minutes, the shearing velocity being controlled at 8,000 r/min, and the sheared premix is swelled in a swelling tank at 175° C. for 50 minutes to obtain the first mix;

An XT-1 type anti-stripping agent and sulfur are added to the first mix, which is stirred at 175° C. for 25 minutes to obtain a second mix;

The second mix is fed into a shear pump, the shearing velocity being controlled at 8,000 r/min, and after shearing for 40 minutes, milled in a colloid mill for 30 minutes to obtain an initial sample of modified asphalt; the average particle size of the modifier in the initial sample is 1.5 µm.

The initial sample of modified asphalt is transferred to a finished product development tank and maintained at 180° C. for 36 hours to obtain the modified asphalt.

According to this disclosure, the properties and key indexes of the modified asphalt obtained in this example are tested. In the test, relevant test methods in the Standard Test Methods of Bitumen and Bituminous Mixtures for Highway Engineering (JTG E20-2011) are used. The results are shown in Table 1.

EXAMPLE 2

Modifier: obtained by mixing 1.8 parts of SBS with a number average molecular weight of 200,000, 1.2 parts of rubber powder with a particle size of 100 meshes, and 1 part of polyurethane with a number average molecular weight of 150,000 at room temperature for 15 minutes.

Raw materials: 110 parts of 70# matrix asphalt, 16 parts of a modifier, four parts of aromatic oil, 0.2 parts of sulfur, 0.5 parts of XT-1 type anti-stripping agent, and 0.3 parts of KH560.

The matrix asphalt is heated at 170° C. for 3 hours, followed by the addition of the modifier, aromatic oil and KH560, which is stirred for 15 minutes to obtain a premix.

The premix is fed into a shear pump, the shearing velocity being controlled at 9,000 r/min, and after shearing for 30 minutes, the sheared premix is swelled in a swelling tank at 170° C. for 30 minutes to obtain the first mix.

An XT-1 type anti-stripping agent and sulfur are added to the first mix, which is stirred at 170° C. for 15 minutes to obtain a second mix.

The second mix is fed into a shear pump, the shearing velocity being controlled at 9,000 r/min, and after shearing for 40 minutes, milled in a colloid mill for 10 minutes to obtain an initial sample of modified asphalt; the average particle size of the modifier in the initial sample is 2.7 μm.

The initial sample of modified asphalt is transferred to a finished product development tank and maintained at 182° C. for 32 hours to obtain a finished product of modified asphalt.

The properties and key indexes of the modified asphalt obtained in this example are tested. The results are shown in Table 1.

EXAMPLE 3

The modifier is the same as that of Example 1.

Raw materials: 110 parts of 90# matrix asphalt, 18 parts of a modifier, five parts of aromatic oil, 0.2 parts of sulfur, 0.5 parts of XT-2 type anti-stripping agent and 0.3 parts of silane coupling agent.

The matrix asphalt is heated at 168° C. for 2.5 hours, followed by the addition of the modifier, aromatic oil and KH560, which is stirred for 25 minutes to obtain a premix.

The premix is fed into a shear pump, the shearing velocity being controlled at 8,000 r/min, and after shearing for 45 minutes, the sheared premix is swelled in a swelling tank at 168° C. for 40 minutes to obtain the first mix.

An XT-2 type anti-stripping agent and sulfur are added to the first mix, which is stirred at 168° C. for 20 minutes to obtain a second mix.

The second mix is fed into a shear pump, the shearing velocity being controlled at 8,000 r/min, and after shearing for 35 minutes, milled in a colloid mill for 20 minutes to obtain an initial sample of modified asphalt; the average particle size of the modifier in the initial sample is 2.1 μm.

The initial sample of modified asphalt is transferred to a finished product development tank, and maintained at 176° C. for 24 hours to obtain a modified asphalt.

The properties and key indexes of the modified asphalt obtained in this example are tested. The results are shown in Table 1.

TABLE 1

Results of performance test of modified asphalts in Examples 1 to 3.

| Test items | Unit | Technically required | Ex. 1 | Ex. 2 | Ex. 3 | JTG E20-2011 test methods |
|---|---|---|---|---|---|---|
| Penetration (25° C., 5 s, 100 g) | 0.1 mm | 30 to 50 | 31 | 38 | 47 | T0604 |
| Softening point $T_{R\&B}$ | ° C. | ≥90 | 106 | 103 | 95 | T0606 |
| Elastic recovery (25° C.) | % | ≥95 | 99.5 | 99.2 | 98.5 | T0662 |
| Solubility (trichloroethylene) | % | ≥99 | 99.5 | 99.5 | 99.6 | T0607 |
| Segregation, 48 h softening point difference | ° C. | ≤2.5 | 1.0 | 1.5 | 1.5 | T0661 |
| Composite shear modulus G* at 60° C. | kPa | ≥10 | 18.5 | 16.4 | 13.2 | T0628 |
| Dynamic viscosity at 60° C. | 10,000 Pa · s | ≥50 | 80 | 75 | 68 | T0620 |
| Mass loss | % | ±1.0 | 0.05 | 0.02 | 0.03 | T0610/T0609 |
| Critical temperature at $G^*/\sin\delta \geq 2.2$ kPa | ° C. | ≥94 | 100 | 100 | 94 | T0628 |

According to the data in Table 1, it can be known that the modified asphalt provided by this disclosure has excellent elastic recovery performance, thermal stability, high temperature stability, bonding performance and storage stability. From the perspective of technical indexes, the modified asphalt provided by this disclosure can simultaneously satisfy an elastic recovery at 25° C. of ≥98%, a dynamic viscosity at 60° C. of ≥500,000 Pa·s, a composite shear modulus at 60° C. of ≥10 Pa, and a critical temperature at $G^*/\sin\delta \geq 2.2$ kPa above 94° C.

The description of the above examples is only used to help understand the method of this disclosure and its core concept. It should be noted that for a person of ordinary skill in this art, without departing from the principles of this disclosure, various improvements and modifications can be made to this disclosure, and these improvements and modifications also fall within the protection scope of the claims of this disclosure. Various modifications to these examples will be apparent to a person skilled in this art, and the general principles defined herein may be implemented in other examples without departing from the spirit or scope of the disclosure. Therefore, this disclosure will not be limited to the examples as described herein and shall conform to the widest scope consistent with the principles and novel features disclosed herein.

What is claimed is:

1. A modified asphalt, which is prepared from the following raw materials in parts by weight, the modified asphalt comprising:
100 to 120 parts of a matrix asphalt, 6 to 20 parts of a modifier, 3 to 9 parts of a compatibilizer, 0.15 to 0.25 parts of sulfur, 0.4 to 0.6 parts of a non-amine anti-stripping agent and 0.2 to 0.4 parts of a coupling agent;
wherein the modifier comprises a styrene-butadiene-styrene block copolymer, a rubber, and a polyurethane.

2. The modified asphalt according to claim 1, wherein the mass ratio of the styrene-butadiene-styrene block copolymer, rubber, and polyurethane in the modifier is 1 to 4:0.5 to 2:0.5 to 2.

3. The modified asphalt according to claim 1, wherein the styrene-butadiene-styrene block copolymer has a star-shaped structure and a number average molecular weight of greater than 200,000;
wherein the rubber is a rubber powder, which has a particle diameter of 40 to 100 meshes; and
The wherein the polyurethane has a number average molecular weight of greater than 10,000.

4. The modified asphalt according to claim 2, wherein the styrene-butadiene-styrene block copolymer has a star-shaped structure and a number average molecular weight of greater than 200,000; wherein the rubber is a rubber powder, which has a particle diameter of 40 to 100 meshes; and wherein the polyurethane has a number average molecular weight of greater than 10,000.

5. The modified asphalt according to claim 1, wherein the compatibilizer is one or more of aromatic hydrocarbons, linear alkanes, and cycloalkanes.

6. The modified asphalt according to claim 1, wherein the coupling agent is a silane coupling agent.

7. A method for preparing the modified asphalt according to claim 1, wherein the method comprises the steps;
(1) mixing melted matrix asphalt with a modifier, a compatibilizer, and a coupling agent to obtain a premix;
(2) subjecting the premix obtained in step (1) sequentially to shearing and swelling to obtain the first mix;
(3) mixing the first mix obtained in step (2) with a non-amine anti-stripping agent and sulfur to obtain a second mix; and
(4) subjecting the second mix obtained in step (3) sequentially to shearing, milling, and development to obtain a modified asphalt The modified asphalt according to claim 1, wherein the coupling agent is a silane coupling agent.

8. The method for preparing the modified asphalt, according to claim 2, wherein the method comprises the steps;
(1) mixing melted matrix asphalt for a modifier, a compatibilizer, and a coupling agent to obtain a premix;
(2) subjecting the premix obtained in step (1) sequentially to shearing and swelling to obtain the first mix;
(3) mixing the first mix obtained in step (2) with a non-amine anti-stripping agent and sulfur to obtain a second mix; and
(4) subjecting the second mix obtained in step (3) sequentially to shearing, milling, and development to obtain a modified asphalt.

9. The method for preparing the modified asphalt according to claim 3, wherein the method comprises the steps;
(1) mixing melted matrix asphalt with a modifier, a compatibilizer, and a coupling agent to obtain a premix;
(2) subjecting the premix obtained in step (1) sequentially to shearing and swelling to obtain the first mix;
(3) mixing the first mix obtained in step (2) with a non-amine anti-stripping agent and sulfur to obtain a second mix; and
(4) subjecting the second mix obtained in step (3) sequentially to shearing, milling, and development to obtain a modified asphalt.

10. The method for preparing the modified asphalt according to claim 4, wherein the method comprises the steps:
(1) mixing melted matrix asphalt with a modifier, a compatibilizer, and a coupling agent to obtain a premix;
(2) subjecting the premix obtained in step (1) sequentially to shearing and swelling to obtain the first mix;
(3) mixing the first mix obtained in step (2) with a non-amine anti-stripping agent and sulfur to obtain a second mix; and
(4) subjecting the second mix obtained in step (3) sequentially to shearing, milling, and development to obtain a modified asphalt.

11. The method for preparing the modified asphalt according to claim 5, wherein the method comprises the steps:
(1) mixing melted matrix asphalt with a modifier, a compatibilizer, and a coupling agent to obtain a premix;
(2) subjecting the premix obtained in step (1) sequentially to shearing and swelling to obtain the first mix;
(3) mixing the first mix obtained in step (2) with a non-amine anti-stripping agent and sulfur to obtain a second mix; and
(4) subjecting the second mix obtained in step (3) sequentially to shearing, milling, and development to obtain a modified asphalt.

12. The method for preparing the modified asphalt according to claim 6, wherein the method comprises the steps:
(1) mixing melted matrix asphalt with a modifier, a compatibilizer, and a coupling agent to obtain a premix;
(2) subjecting the premix obtained in step (1) sequentially to shearing and swelling to obtain a first mix;
(3) mixing the first mix obtained in step (2) with a non-amine anti-stripping agent and sulfur to obtain a second mix; and
(4) subjecting the second mix obtained in step (3) sequentially to shearing, milling and development to obtain a modified asphalt.

13. The method for preparing the modified asphalt according to claim 7, wherein the temperature of the mixing in step (1) is 160 to 180° C.

14. The method for preparing the modified asphalt according to claim 7, wherein the velocity of shearing in step (2) and step (4) is independently 7,000 to 10,000 r/min, and the time of shearing is independently 30 to 50 minutes.

15. The method for preparing the modified asphalt according to claim 7, wherin the time of swelling in step (2) is 30 to 50 minutes.

16. The method for preparing the modified asphalt according to claim 14, wherein the time of swelling in step (2) is 30 to 50 minutes.

17. The method for preparing the modified asphalt according to claim 7, wherein the velocity of milling in step (4) is 10,000 to 14,000 r/min, and the time of milling is 10 to 30 minutes.

18. The method for preparing the modified asphalt according to claim 14, wherein the velocity of milling in step (4) is 10,000 to 14,000 r/min, and the time of milling is 10 to 30 minutes.

* * * * *